(12) United States Patent
Iura et al.

(10) Patent No.: US 11,859,862 B2
(45) Date of Patent: Jan. 2, 2024

(54) DRY SPACE CREATION SYSTEM

(71) Applicant: HONDA MOTOR CO., LTD., Tokyo (JP)

(72) Inventors: Satonori Iura, Saitama (JP); Satoshi Yonezawa, Saitama (JP); Satoshi Aoki, Saitama (JP); Shigeto Akahori, Saitama (JP); Shuga Ikeda, Saitama (JP); Yui Kinoshita, Saitama (JP); Masaki Kunigami, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 42 days.

(21) Appl. No.: 17/680,325

(22) Filed: Feb. 25, 2022

(65) Prior Publication Data
US 2022/0290875 A1 Sep. 15, 2022

(30) Foreign Application Priority Data
Mar. 15, 2021 (JP) ................. 2021-041016

(51) Int. Cl.
*F24F 3/14* (2006.01)
*F24F 13/08* (2006.01)

(52) U.S. Cl.
CPC ............. *F24F 3/14* (2013.01); *F24F 13/082* (2013.01); *F24F 2003/144* (2013.01); *F24F 2013/087* (2013.01)

(58) Field of Classification Search
CPC ...................................................... F24F 3/14
See application file for complete search history.

(56) References Cited

FOREIGN PATENT DOCUMENTS

| CN | 106931768 A | | 7/2017 |
|----|-------------|---|--------|
| JP | S60142185 A | | 7/1985 |
| JP | 2005061719 A | | 3/2005 |
| JP | 2007132602 A | * | 5/2007 |
| KR | 1020100103499 | * | 9/2010 |

OTHER PUBLICATIONS

Office Action issued in the CN Patent Application No. 202210183850. 4, dated Jun. 8, 2023.

* cited by examiner

*Primary Examiner* — Robert A Hopkins
(74) *Attorney, Agent, or Firm* — CKC & Partners Co., LLC

(57) ABSTRACT

A dry space creation system includes a hollow treatment tank configured to house a material to be treated, an inflatable balloon member having a balloon shape configured to be inflated and deflated by supply and exhaust of air, the inflatable balloon member being provided inside the treatment tank, and being configured to be inflated while leaving a partial area in the treatment tank, a dry air supply unit configured to supply dry air into the area, and an inflation air supply unit configured to supply air into the inflatable balloon member.

3 Claims, 3 Drawing Sheets

DRY SPACE CREATION SYSTEM

This application is based on and claims the benefit of priority from Japanese Patent Application No. 2021-041016, filed on 15 Mar. 2021, the content of which is incorporated herein by reference.

BACKGROUND OF THE INVENTION

Field of the Invention

The present invention relates to a dry space creation system.

Related Art

Conventionally, to manufacture a member requiring a dry environment that has a dew point less than or equal to a predetermined temperature, in a manufacturing line, a dry room, inside of which is maintained at low humidity has been used. For example, to manufacture an all-solid-state battery, a dry room is provided in a predetermined area of the manufacturing line in order to handle a sulfide-based solid electrolyte which is vulnerable to moisture.

The dry room is provided so as to house an entire manufacturing facility and to cover the predetermined area of the manufacturing line. Therefore, the dry room is wide. Accordingly, to bring the dew point in the dry room to a set temperature and to maintain the dew point arrived at, a large amount of dry air is necessary. Therefore, cost for an air conditioning facility and cost for supply of the dry air are increased. In addition, since the dry room is wide, it takes time to bring the inside of the dry room into the dry environment. For example, it takes time to return the inside of the dry room to the dry environment after maintenance. Workers perform operations in the wide dry room. Therefore, it is necessary to further enhance dehumidifying capacity of a dehumidification apparatus in consideration of sweating of the workers.

Therefore, in the manufacturing facility, a space housing a product to be manufactured may be brought into the dry environment. For example, Patent Document 1 described below discloses a dry booth that is a local dry space. Air having a low dew point after dehumidification treatment is supplied into the dry booth from a clean dry air supply apparatus. This maintains an atmosphere in the dry booth in the predetermined low dew point environment. In this case, unlike the above-described dry room, the space to be brought into the dry environment is small. This makes it possible to reduce the cost for supply of the dry air, and to reduce the time necessary for bringing the space into the dry environment.

Patent Document 1: Japanese Unexamined Patent Application, Publication No. 2005-61719

SUMMARY OF THE INVENTION

However, it is desirable to further reduce the cost for supply of the dry air. In addition, it is desirable to further reduce the time necessary for bringing the space into the dry environment.

The present invention is directed to providing a dry space creation system that can further reduce cost for supply of dry air and can further reduce time necessary for bringing a space into a dry environment.

A first aspect of the present invention relates to a dry space creation system including: a hollow treatment tank configured to house a material to be treated; an inflatable balloon member having a balloon shape configured to be inflated and deflated by supply and exhaust of air, the inflatable balloon member being provided inside the treatment tank, and being configured to be inflated while leaving a partial area in the treatment tank; a dry air supply unit configured to supply dry air into the area; and an inflation air supply unit configured to supply air into the inflatable balloon member.

A second aspect of the present invention relates to the dry space creation system as described in the first aspect, in which in place of the inflation air supply unit, the dry air supply unit may supply the dry air into the inflatable balloon member, and the dry air supplied into the inflatable balloon member may be supplied into the area through a through hole provided in the inflatable balloon member.

A third aspect of the present invention relates to the dry space creation system as described in the first aspect, in which the dry space creation system may further include an interference prevention member configured to prevent interference between the inflatable balloon member inflated by the supplied air and a device positioned inside the area.

A fourth aspect of the present invention relates to the dry space creation system as described in the first aspect, in which the material to be treated may be a battery under manufacture.

According to the present invention, it is possible to provide the dry space creation system that can further reduce the cost for supply of the dry air and can further reduce the time necessary for bringing the space into the dry environment.

DETAILED DESCRIPTION OF THE INVENTION

Some specific embodiments of the present invention are described in detail below with reference to drawings.

Figure 1:
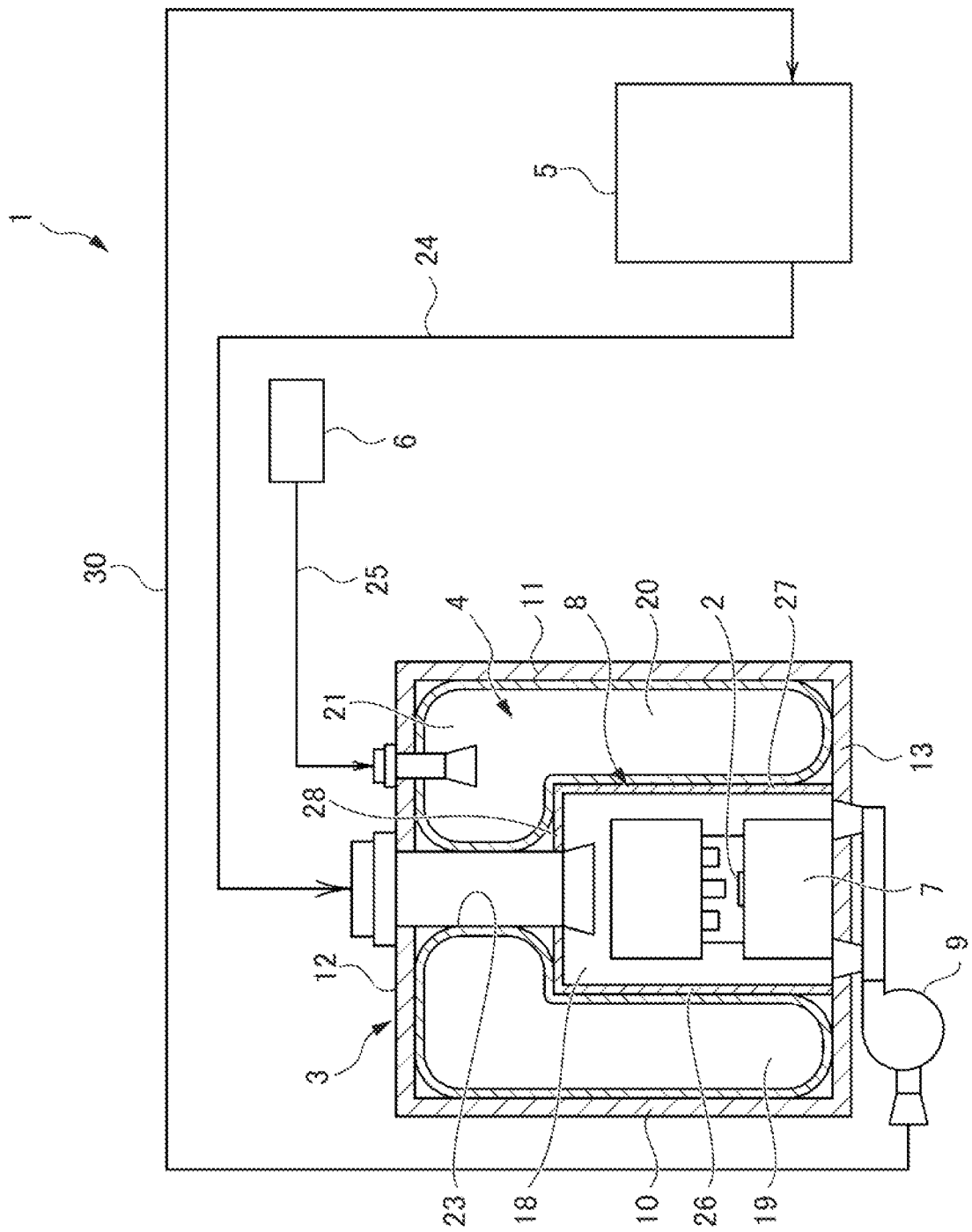
FIG. 1 is a schematic configuration diagram illustrating a dry space creation system according to Embodiment 1 of the present invention.
Figure 2:
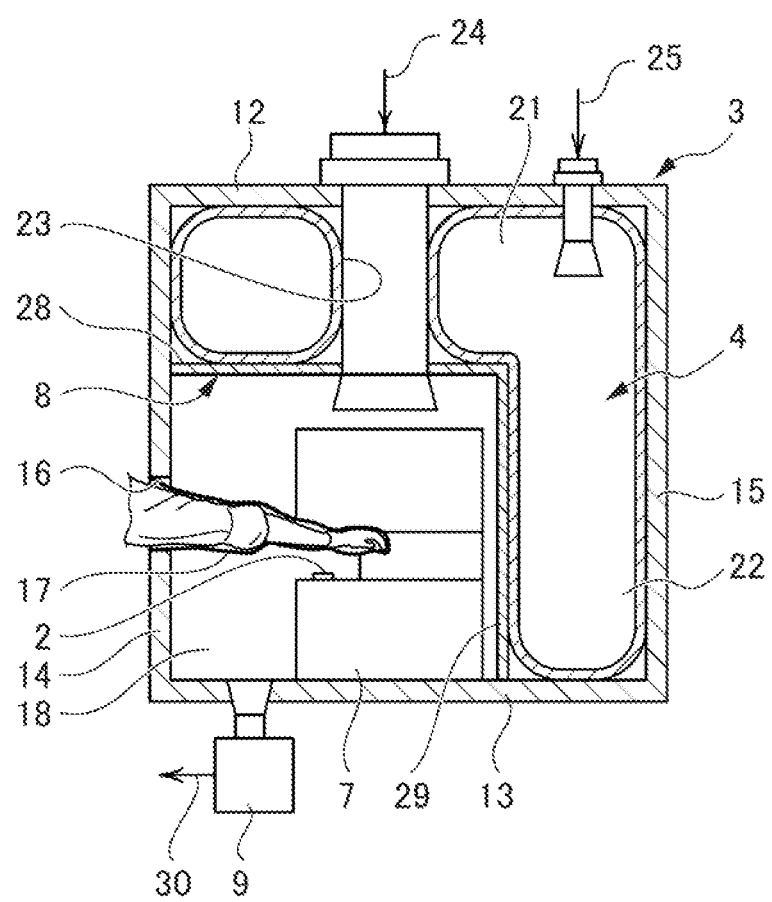
FIG. 2 is a schematic side view of a treatment tank in FIG. 1.

FIG. 1 is a schematic configuration diagram illustrating a dry space creation system according to Embodiment 1 of the present invention. FIG. 2 is a schematic right-side view of a treatment tank in FIG. 1. FIG. 1 illustrates the treatment tank as viewed from a front side.

A dry space creation system 1 according to Embodiment 1 includes a hollow treatment tank 3 housing a material to be treated 2, an inflatable balloon member 4 having a balloon shape provided inside the treatment tank 3, a dry air supply unit 5 supplying dry air into the treatment tank 3, an inflation air supply unit 6 supplying air into the inflatable balloon member 4, an interference prevention member 8 preventing interference between the inflatable balloon member 4 inflated by supplied air and a device 7 positioned inside the treatment tank 3, and an exhaust unit 9 exhausting the air inside the treatment tank 3. In this example, a case is described where the dry space creation system 1 according to Embodiment 1 is applied to a facility including the treatment tank 3, inside of which is a dry space, among battery manufacturing facilities; however, the application is not limited thereto. In the case where the dry space creation system 1 is applied to the battery manufacturing facilities, the material to be treated 2 is a battery under manufacture. Typically, the material to be treated 2 is an all-solid-state battery under manufacture.

The treatment tank 3 has a hollow shape that can seal the material to be treated 2. In an illustrated example, the treatment tank 3 has a substantially rectangular hollow box shape including a left-side wall 10, a right-side wall 11, an upper wall 12, a lower wall 13, a front wall 14, and a rear wall 15. Typically, the treatment tank 3 includes an opening. A hollow conveyance path provided between the treatment tank 3 and an adjacent facility is connected to the opening. In this case, the material to be treated 2 is conveyed into the treatment tank 3 from the facility adjacent to the treatment tank 3 through the conveyance path. In the treatment tank 3, treatment is actually performed on the material to be treated 2. In addition, processing to check a surface, an inside, etc. of the material to be treated 2 may be performed.

The device 7 treating the material to be treated 2 is provided inside the treatment tank 3. As described above, since the dry space creation system 1 is applied to the all-solid-state battery manufacturing facilities, the device 7 is a device used to manufacture the all-solid-state battery. Note that the dry space creation system 1 is applicable not only to the manufacturing facilities in the manufacturing line for the all-solid-state battery, but also to an evaluation facility for the material to be treated 2 extracted from the manufacturing line. In this case, the device 7 is a device used to evaluate the extracted material to be treated 2, and is, for example, a laser microscope.

In Embodiment 1, a glove 17 into which an arm is insertable is provided in one or a plurality of openings 16 provided on the front wall 14 of the treatment tank 3. The glove 17 is made of a synthetic resin. The glove 17 is provided while an end on a side from which the arm is inserted is airtight relative to the front wall 14. This makes it possible to operate the device 7 in the treatment tank 3 with a hand wearing the glove 17.

The inflatable balloon member 4 has a balloon shape inflated and deflated by supply and exhaust of the air. The inflatable balloon member 4 is made of, for example, butyl rubber, chloroprene rubber, styrene-butadiene rubber, or ethylene-propylene diene rubber. The inflatable balloon member 4 has a shape inflated in the treatment tank 3 such that a partial area 18 remains in the treatment tank 3. In Embodiment 1, in the inflated state, the inflatable balloon member 4 has a box shape including an opened front surface and an opened lower surface. More specifically, the inflatable balloon member 4 includes a hollow left wall portion 19, a hollow right wall portion 20, a hollow upper wall portion 21, and a hollow rear wall portion 22. Insides of these portions communicate with one another. The upper wall portion 21 of the inflatable balloon member 4 includes a through hole 23 penetrating through the upper wall portion 21 in a vertical direction.

In the inflatable balloon member 4 in the inflated state, in the treatment tank 3, the left wall portion 19, the right wall portion 20, the upper wall portion 21, the rear wall portion 22 respectively abut on the left-side wall 10, the right-side wall 11, the upper wall 12, and the rear wall 15 of the treatment tank 3. Further, a lower end of the inflatable balloon member 4 airtightly abuts on the lower wall 13 of the treatment tank 3, and a front end of the inflatable balloon member 4 airtightly abuts on the front wall 14 of the treatment tank 3. As a result, the hollow area 18 surrounded by the left wall portion 19, the right wall portion 20, the upper wall portion 21, and the rear wall portion 22 of the inflatable balloon member 4 and the front wall 14 and the lower wall 13 of the treatment tank 3 remains in the treatment tank 3. The above-described device 7 is positioned inside the area 18.

The dry air supply unit 5 supplies dry air into the area 18 of the treatment tank 3. The dry air supply unit 5 according to Embodiment 1 is, for example, a dehumidifier. The dry air from the dry air supply unit 5 is supplied into the area 18 of the treatment tank 3 through a dry air supply path 24. The dry air supply path 24 includes an unillustrated dry air supply valve. The dry air supply valve opens and closes the dry air supply path 24.

The inflation air supply unit 6 supplies air into the inflatable balloon member 4. The inflation air supply unit 6 according to Embodiment 1 is, for example, an air pump. The air from the inflation air supply unit 6 is supplied into the inflatable balloon member 4 through an air supply path 25. A downstream-side end of the air supply path 25 penetrates through the upper wall 12 of the treatment tank 3, and is opened inside the inflatable balloon member 4. The air supply path 25 includes an unillustrated air supply valve. The air supply valve opens and closes the air supply path 25.

The interference prevention member 8 has a box shape including an opened front surface and an opened lower surface. More specifically, the interference prevention member 8 includes a left-side plate portion 26, a right-side plate portion 27, an upper plate portion 28, and a rear plate portion 29. The interference prevention member 8 is provided inside the area 18 of the treatment tank 3. At this time, the interference prevention member 8 is provided on the lower wall 13 of the treatment tank 3 such that the left-side plate portion 26, the right-side plate portion 27, the upper plate portion 28, and the rear plate portion 29 respectively correspond to the left wall portion 19, the right wall portion 20, the upper wall portion 21, and the rear wall portion 22 of the inflatable balloon member 4. The above-described device 7 is positioned inside the interference prevention member 8. Therefore, the interference prevention member 8 is positioned between the inflated inflatable balloon member 4 and the device 7.

The dry air from the dry air supply unit 5 is supplied into the interference prevention member 8 in which the device 7 is internally positioned. Therefore, a downstream-side end of the dry air supply path 24 penetrates through the upper wall 12 of the treatment tank 3 and passes through the through hole 23 of the inflatable balloon member 4, and is opened in the interference prevention member 8. At this time, an outer peripheral surface of the dry air supply path 24 and an inner peripheral surface of the through hole 23 of the inflatable balloon member 4 airtightly abut on each other.

As illustrated in FIG. 1, the air inside the area 18 of the treatment tank 3 is collected to the dry air supply unit 5 through an air collection path 30. An upstream-side end of the air collection path 30 is opened in the area 18 of the treatment tank 3. The air collection path 30 includes an unillustrated air collection valve. The air collection valve opens and closes the air collection path 30. The exhaust unit 9 is provided in the middle of the air collection path 30. The exhaust unit 9 according to Embodiment 1 is an air blower. In this case, a suction port of the exhaust unit 9 is connected to the treatment tank 3, whereas a discharge port is connected to the dry air supply unit 5. Note that the exhaust unit 9 may be a pump exhausting the air.

Next, an example of operation of the dry space creation system 1 according to Embodiment 1 is described. The operation described below is basically automatically performed by an unillustrated controller. Before the dry space creation system 1 is operated, the inflatable balloon member 4, the interference prevention member 8, and the device 7 are provided inside the treatment tank 3.

In the dry space creation system 1 according to Embodiment 1, first, the air supply valve provided in the air supply path 25 is opened and the inflation air supply unit 6 is operated to supply air into the inflatable balloon member 4, thereby inflating the inflatable balloon member 4. After the inflatable balloon member 4 is completely inflated, the air supply valve is closed and operation of the inflation air supply unit 6 is stopped. Thereafter, the dry air supply valve provided in the dry air supply path 24 is opened and the dry air supply unit 5 is operated to supply the dry air into the area 18 of the treatment tank 3. At this time, the air collection valve provided in the air collection path 30 is opened and the exhaust unit 9 is operated to collect the air inside the area 18 of the treatment tank 3, to the dry air supply unit 5.

When an atmosphere in the area 18 of the treatment tank 3 reaches a predetermined dew point by the dry air, the amount of dry air supplied from the dry air supply unit 5 is adjusted so as to maintain the state. This is achieved by adjusting an opening degree of the dry air supply valve.

In Embodiment 1, the area 18 where the material to be treated 2 is treated remains in the treatment tank 3 when the inflatable balloon member 4 is inflated. Further, the dry air is supplied into the area 18 to adjust the atmosphere in the area 18 to the predetermined dew point. Therefore, according to Embodiment 1, it is possible to make a space where the atmosphere is adjusted to the predetermined dew point small as compared with a case where an atmosphere in the treatment tank 3 is adjusted to the predetermined dew point. In other words, as compared with a case of bringing the inside of the treatment tank 3 into the dry environment, the space to be brought into the dry environment can be made small, which makes it possible to reduce the cost for supply of the dry air. In addition, making the space to be brought into the dry environment smaller than the treatment tank 3 makes it possible to reduce the time necessary for bringing the space into the dry environment. For example, it is possible to reduce the time to return the space to the dry environment after maintenance.

Further, in Embodiment 1, since the area 18 can remain when the inflatable balloon member 4 is inflated, it is possible to easily create the area 18 to be brought into the dry environment. Furthermore, in Embodiment 1, the inside of the area 18 can be put into a negative pressure state by the exhaust unit 9. Therefore, the air inside the area 18 can be efficiently replaced with the dry air.

Figure 3:
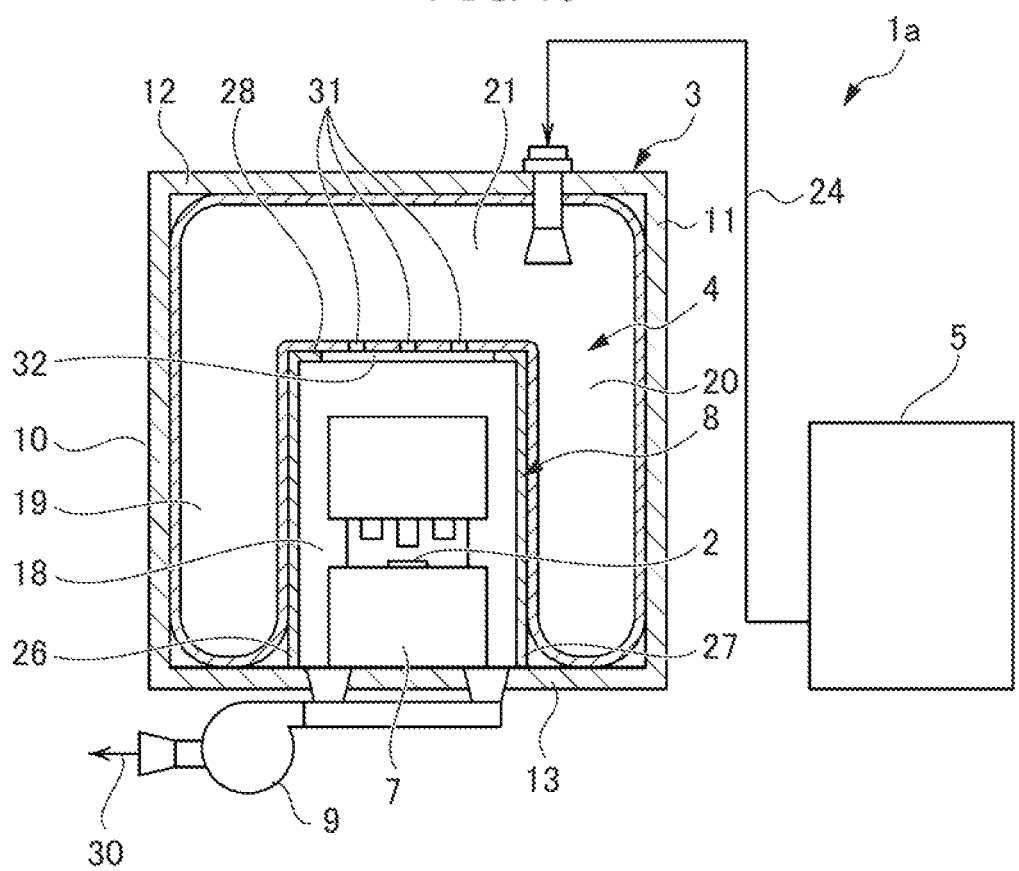
FIG. 3 is a schematic configuration diagram illustrating a dry space creation system according to Embodiment 2 of the present invention.

FIG. 3 is a schematic configuration diagram illustrating a dry space creation system according to Embodiment 2 of the present invention, and illustrates a treatment tank as viewed from a front side. In Embodiment 2, features are described, and descriptions of the matters described in Embodiment 1 described above are omitted.

In Embodiment 1 described above, the dry air supply unit 5 supplying the dry air into the area 18 and the inflation air supply unit 6 supplying the air into the inflatable balloon member 4 are provided. In Embodiment 2, in place of the inflation air supply unit 6, the dry air supplied into the inflatable balloon member 4 by the dry air supply unit 5 is supplied into the area 18. In Embodiment 2, the dry air supply unit 5 supplies the dry air into the inflatable balloon member 4. The dry air supply unit 5 is, for example, a dehumidifier. The dry air from the dry air supply unit 5 is supplied into the inflatable balloon member 4 through the dry air supply path 24. The downstream-side end of the dry air supply path 24 penetrates through the upper wall 12 of the treatment tank 3, and is opened in the inflatable balloon member 4. The dry air supply path 24 includes an unillustrated dry air supply valve. The dry air supply valve opens and closes the dry air supply path 24.

The air inside the area 18 is collected to the dry air supply unit 5 through the air collection path 30. In other words, the air collection path 30 is connected to the dry air supply unit 5. As in Embodiment 1 described above, the air collection path 30 includes the unillustrated air collection valve and the exhaust unit 9.

As in Embodiment 1 described above, the inflatable balloon member 4 has a box shape including an opened front surface and an opened lower surface. In Embodiment 1 described above, the inflatable balloon member 4 includes the through hole 23, whereas in Embodiment 2, the inflatable balloon member 4 does not include the through hole 23. The inflatable balloon member 4 according to Embodiment 2 includes one or a plurality of through holes 31 that make inside and outside of a hollow portion to which the dry air is supplied, communicate with each other. The through holes 31 are provided at lower end of the upper wall portion 21 of the inflatable balloon member 4.

As in Embodiment 1 described above, the interference prevention member 8 has a box shape including an opened front surface and an opened lower surface. The upper plate portion 28 of the interference prevention member 8 according to Embodiment 2 includes an opening 32 penetrating through the upper plate portion 28 in the vertical direction. The opening 32 and the through holes 31 of the inflatable balloon member 4 in the inflated state are located at positions corresponding to each other. In other words, the hollow portion of the inflatable balloon member 4 to which the dry air is supplied and the inside of the interference prevention member 8 communicate with each other through the through holes 31 of the inflatable balloon member 4 and the opening 32 of the interference prevention member 8.

Operation of a dry space creation system 1*a* according to Embodiment 2 is basically automatically performed by an unillustrated controller as in Embodiment 1 described above. Note that the operation described below is illustrative.

In the dry space creation system 1*a* according to Embodiment 2, the dry air supply valve provided in the dry air supply path 24 is opened, and the dry air supply unit 5 is operated. At this time, the air collection valve provided in the air collection path 30 is opened, and the exhaust unit 9 is operated. As a result, the inflatable balloon member 4 is inflated, and the dry air is supplied into the area 18 from the inflatable balloon member 4 through the through holes 31 and the opening 32. When the atmosphere in the area 18 reaches the predetermined dew point in a state where the inflatable balloon member 4 is completely inflated, the amount of dry air supplied from the dry air supply unit 5 is adjusted so as to maintain the state. This is achieved by adjusting an opening degree of the dry air supply valve.

In Embodiment 2, the inflatable balloon member 4 can be inflated and the area 18 can be brought into the dry environment by the dry air supply unit 5. Therefore, the configuration can be made simple. Further, in Embodiment 2, since the air inside the inflatable balloon member 4 is dry air, the area 18 is surrounded by a layer of the dry air. This makes it possible to prevent moisture from entering the area 18 from outside.

The present invention is not limited to the above-described embodiments, and modifications and improvements within a scope where the objects of the present invention can be achieved are included in the present invention.

For example, in Embodiment 1 described above, normal air is supplied into the inflatable balloon member 4; however, dry air may be supplied into the inflatable balloon member 4. In this case, the inflation air supply unit is a unit supplying the dry air. As described above, the inflation air supply unit and the dry air supply unit may be provided, or a common dry air supply unit may supply the dry air into the inflatable balloon member 4 and the area 18.

EXPLANATION OF REFERENCE NUMERALS

1, 1*a*: Dry space creation system
2: Material to be treated
3: Treatment tank
4: Inflatable balloon member
5: Dry air supply unit
6: Inflation air supply unit
7: Device
8: Interference prevention member
18: Area
31: Through hole

What is claimed is:

1. A dry space creation system, comprising:
a hollow treatment tank configured to house a material to be treated;
an inflatable balloon member having a balloon shape configured to be inflated and deflated by supply and exhaust of air, the inflatable balloon member being provided inside the treatment tank, and being configured to be inflated while leaving a partial area in the treatment tank;
a dry air supply unit configured to supply dry air into the treatment tank;
an inflation air supply unit configured to supply air into the inflatable balloon member; and
an interference prevention member configured to prevent interference between the inflatable balloon member inflated by the supplied air and a device positioned inside the treatment tank.

2. The dry space creation system according to claim 1, wherein
the material to be treated is a battery.

3. A dry space creation system, comprising:
a hollow treatment tank configured to house a material to be treated;
an inflatable balloon member having a balloon shape configured to be inflated and deflated by supply and exhaust of air, the inflatable balloon member being provided inside the treatment tank, and being configured to be inflated while leaving a partial area in the treatment tank; and
a dry air supply unit configured to supply dry air into the treatment tank;
wherein the dry air supply unit supplies the dry air into the inflatable balloon member, and the dry air supplied into the inflatable balloon member is supplied into the treatment tank through a through hole provided in the inflatable balloon member.

* * * * *